(12) United States Patent
Herta

(10) Patent No.: US 8,010,833 B2
(45) Date of Patent: Aug. 30, 2011

(54) SOFTWARE APPLICATION CLUSTER LAYOUT PATTERN

(75) Inventor: Benjamin W. Herta, Poughquag, NY (US)

(73) Assignee: International Business Machines Corporation, Armonk, NY (US)

(*) Notice: Subject to any disclaimer, the term of this patent is extended or adjusted under 35 U.S.C. 154(b) by 233 days.

(21) Appl. No.: 12/356,219

(22) Filed: Jan. 20, 2009

(65) Prior Publication Data

US 2010/0185894 A1 Jul. 22, 2010

(51) Int. Cl.
*G06F 11/00* (2006.01)
(52) U.S. Cl. .......................................... 714/4.2; 714/11
(58) Field of Classification Search .................. 714/4, 11
See application file for complete search history.

(56) References Cited

U.S. PATENT DOCUMENTS

| | | | | |
|---|---|---|---|---|
| 6,757,836 B1* | 6/2004 | Kumar et al. | ................... | 714/4.1 |
| 6,862,613 B1* | 3/2005 | Kumar et al. | ................. | 709/220 |
| 6,961,749 B1* | 11/2005 | Kleiman | ....................... | 709/203 |
| 7,543,174 B1* | 6/2009 | van Rietschote et al. | ......... | 714/4 |
| 7,555,673 B1* | 6/2009 | Kelkar et al. | ................... | 714/11 |
| 7,818,408 B1* | 10/2010 | Ignatuk et al. | ................ | 709/221 |
| 2007/0006015 A1* | 1/2007 | Rao et al. | .......................... | 714/4 |
| 2008/0250267 A1* | 10/2008 | Brown et al. | ..................... | 714/4 |
| 2010/0241896 A1* | 9/2010 | Brown et al. | ..................... | 714/4 |

* cited by examiner

*Primary Examiner* — Marc Duncan
(74) *Attorney, Agent, or Firm* — Whitham, Curtis, Christofferson & Cook, P.C.; Wenjie Li

(57) ABSTRACT

In forming a cluster of processors and applications among a plurality of processors connected in a network the embodiment of a pair of cluster nodes, as applications, in each server/system and arranging for communication between them in a ring or tiered ring configuration of servers/systems provides network status monitoring and failure recovery in a highly redundant and flexible manner at increased speed without the requirement of separate communication links for monitoring and control or redundant hardware such as a so-called "hot standby" processor in each server/system.

20 Claims, 5 Drawing Sheets

SOFTWARE APPLICATION CLUSTER LAYOUT PATTERN

BACKGROUND OF THE INVENTION

1. Field of the Invention

The present invention generally relates to operation of network-connected computers running similar or diverse applications and, more particularly, to error and failure detection and automatic failure and error recovery in a transparent manner together with improved communication routing from any network-connected computer to any other.

2. Description of the Prior Art

In recent years, it has become much more common for large endeavors relying on generally large but highly variable requirements for data processing power to utilize a potentially large number of network-connected data processors which may be widely distributed geographically and which may or may not be collectively operating as a larger system rather than a large so-called mainframe data processor for a large variety of reasons. For example, the human resources required for the endeavor may be widely distributed geographically with many resources available for substantial periods of time which would otherwise be largely unused. Moreover, much of the resulting data may be principally useful only locally with periodic summaries and status reports being sufficient for oversight of the progress of the overall endeavor; thereby reducing communication overhead as compared with utilization of a central mainframe data processor. It is also common at the present time to configure computers with comparatively greater computing power as a plurality of independent data processors.

In this regard, networked data processors are often connected in so-called clusters (e.g. comprising a plurality of independent systems which may be actual independent hardware or logical systems made from partitions across one or more larger systems, such as mainframe systems, and which are networked together through TCP/IP over Ethernet™ or some other physical network connection) to improve efficiency of utilization of communication resources as well as to improve availability of information to persons with a need for it.

However, some diversity of applications among network connected computers is inevitable when it is sought to utilize the data processing capability of existing resources. Such diversity carries issues of compatibility and some complications resulting from possible failure of particular network-connected data processors as well as recovery from errors and failures in both communications and/or particular data processor failures.

As a result, applications must currently be coded to work properly as part of some existing cluster design and on a specific platform if they are to have adequate failover recovery/avoidance built into the applications. Failover generally has connoted an arrangement where so-called hot standby machines are provided in a redundant manner for each or most active processors. When failure occurs or is detected, the hot standby machine assumes the processing load and network connections of the failed processor and, in effect, substitutes itself for the failed processor in the network. However, the change-over processing to do so generally requires a period of five to ten minutes or more subsequent to the detection of a failure and such a back-up system of redundant processors virtually doubles the hardware requirements of the networked system. For applications which have not been specifically coded as part of a cluster, system and application failure is handled through monitoring which triggers the failover/processor substitution process and notification for manual or partially automated recovery. However, at the present state of the art, automation of recovery is limited to implementation as a primary/back-up configuration where data processing results are mirrored on another closely associated or dedicated data processor such as the failover arrangement described above. It should be recognized that failover arrangements using a hot standby machine are also subject to the complications presented by the active machine and the hot standby machine being differently configured while the only way to be certain of good failover performance (nevertheless requiring excessive time) is to induce a failure and correct any problems then encountered in the failover processing.

Therefore, monitoring for error detection often requires separate communication facilities and thus cannot adequately monitor the communication facilities themselves or directly provide error or failure recovery of communication facilities while restoration of operation from backed up data and state information on a different processor requires an often an extended period of time (e.g. several seconds to several minutes). During such time, there is often no alternative for the remainder of the system beyond waiting for the recovery of the failed resource(s). Thus, at the present state of the art, while error or failure recovery techniques for specific resources may be relatively well-developed, monitoring for errors and failures of resources requires substantial hardware and processing overhead while actual error and failure recovery may require protracted periods of time comprising utilization of other fully functional back-up resources only on an as-needed basis while being far from transparent to users.

SUMMARY OF THE INVENTION

It is therefore an object of the present invention to provide a method of connecting applications across computers so that they can collectively function as a larger system while providing seamless and transparent server and application failure detection and recovery while using the same links for communication as for monitoring and with improved reliability and response speed without requiring redundant hardware.

It is another object of the invention to provide the meritorious effects alluded to above in a manner which is "platform neutral"; allowing such functions to be performed across a mix of hardware and operating system within the same cluster.

In order to accomplish these and other objects of the invention, a network of computers is provided comprising at least one server/system, each server/system having two cluster nodes, each cluster node being capable of monitoring responses to messages transmitted to another cluster node, an application node capable of connecting to one of the cluster nodes of the at least one server/system for communication to another application node, wherein a first cluster node of the two cluster nodes being in communication with the second cluster node of the two cluster nodes and a first cluster node of the two cluster nodes of a next server system of the network, and the second cluster node of the two cluster nodes is in communication with first and second cluster nodes of the next server/system of the network.

In accordance with another aspect of the invention, a method for operating a network of computers having the above configuration is provided including steps of detecting an apparent failure by monitoring responsiveness of any message from any other application node to the message, and closing, if necessary, and restarting an application in response to detection of an apparent failure in an application, application node or cluster node.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
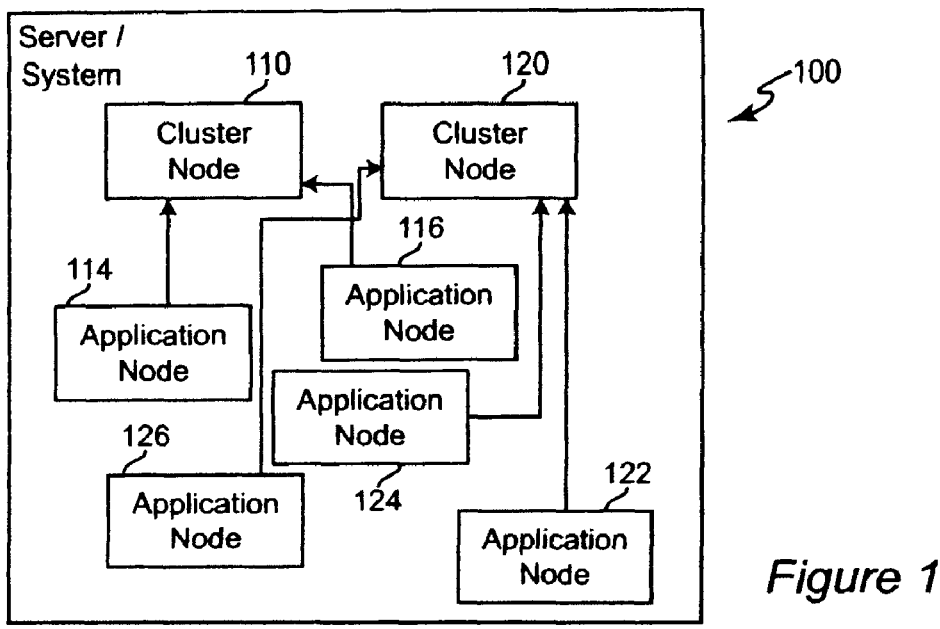
FIG. 1 is a schematic diagram of a single system comprising a single pair of cluster nodes in accordance with a basic unit of articulation of an implementation of the invention.

Referring now to the drawings, and more particularly to FIG. 1, there is shown a schematic diagram of a basic unit of system architecture in accordance with the invention which can be replicated and connected with other such systems to any degree required, as will be further explained in connection with FIGS. 3-6 as will be discussed below. Although not preferred, the architecture of FIG. 1 comprising a single server is sufficient to constitute a system and to obtain the meritorious effects of the invention.

In the following, some current conventions in terminology should be borne in mind. It may facilitate understanding of the invention to consider it as being embodied by one or more servers, each functioning as a potentially independent system. However, the hardware connotations of the term "server" are not at all important to the principles or successful practice of the invention and the term "system" (in the sense of a possibly dynamic partition of hardware capable of functioning as an autonomous processor) should be considered as a synonym thereof but with the understanding that a "system", as that term is currently used in the art, can also extend to a potentially large network of processors and related resources. Therefore, both of these terms as used hereinafter should be understood in the context of the articulation employed in the embodiment of a particular network that could, potentially, be implemented on a single processor of suitable processing capacity and power. In this connection, the term "server/system" will be used hereinafter as a reference to the above usages of terminology in the following discussion of the invention.

By the same token, the term "cluster" should be understood to refer to all cluster nodes which are linked together and that the applications can run on whatever operating system (OS) that is used (e.g. that the operating systems are application-compatible) and including all application nodes connected to any of the cluster nodes in a given cluster. In practice, however, use of the same operating system is preferred but not required. A programming language, such as Java, which can run on most operating systems is also preferred in practice. Therefore, the scope of a cluster may vary from a single server/system to the entirety of the network-connected processors or systems. Thus, by virtue of use of application-compatible operating systems, all cluster nodes and application nodes within a cluster can communicate with each other via mechanisms provided by the cluster just as, by way of analogy, two correspondents may exchange e-mail messages to each other even though they utilize different systems whereas other persons in the same location but without e-mail facilities cannot exchange e-mails with either correspondent and would not be part of the "cluster" while either correspondent, in the event of system failure, can move to another networked system and continue correspondence as before. A cluster may thus be visualized as a layer on top of the network while not all applications on the network are necessarily part of a given cluster or even separate clusters that can communicate with each other through some facility that provides appropriate signal conversion between incompatible operating systems such as TCP/IP which is virtually universal at the present time to provide signal conversion between different operating systems.

In accordance with the invention as well as current clustering techniques (which are not admitted to be prior art in regard to the present invention), each system runs an operating system (OS) such as Windows™, AIX™, Linux™ or any other network-capable OS. In the system implementation of FIG. 1, there are two applications that run on each OS which should be the same for a given server/system and which are referred to as cluster nodes 110, 120. Cluster nodes are responsible for creating linkages across the server/system between applications (and between servers in system implementations including plural servers/systems as will be discussed in connection with FIGS. 3-6) and are constantly forwarding messages to other cluster nodes much in the manner of e-mail servers; generally resulting in the capability of failure detection in much less than one second. Each application which is to participate in the cluster is referred to as an application node 114, 116, 122, 124, 126.

Application nodes know the local port number(s) used by both cluster nodes and choose one at random. If the chosen cluster node is unavailable at start-up or becomes unavailable while running, the application attempts to connect to a cluster node at random until a connection is established or re-established. That is, the connections shown in FIG. 1 are essentially arbitrary at any given point in time. In FIGS. 1-6, it should be appreciated that the arrows used in illustrated connections indicate the direction of initial communications between application nodes and a cluster node or between cluster nodes but that, thereafter, the communication links depicted are, in fact, bi-directional.

Figure 2:
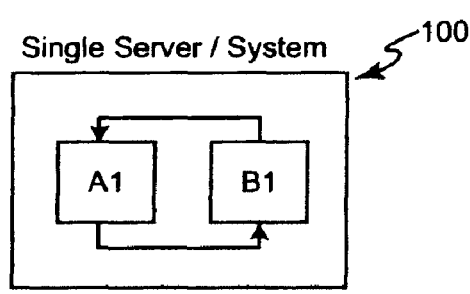
FIG. 2 is a schematic diagram of a representative connection between cluster nodes implemented on a single server in a system limited to the architecture of FIG. 1.

If there is only a single server/system used for hosting applications in the cluster, the connections between the two cluster nodes is as depicted in FIG. 2 (in which connections to application nodes such as are depicted in FIG. 1 are omitted for clarity). The cluster nodes of a given server/system are labeled A and B to differentiate them while the appended number in a cluster node designation refers to the server/system (including a portion of a processor partitioned or configured to operate as a server/system) on which the cluster nodes exist. This configuration allows the cluster node to send and receive messages to and from any application in the cluster regardless of the connection made by the application to a particular cluster node. Thus there is also a communication path from any application in the cluster to any other application in the cluster and the cluster can route communications between any pair of application nodes, possibly by transmitting the data between cluster nodes A and B or through other servers/systems as may be necessary. Further, and importantly in regard to the practice of the invention, each of the cluster nodes can monitor the "health" of the application nodes and other cluster nodes on the same or other servers/systems by validating that the received messages respond to transmitted messages which are part of the networked computer operations or special monitoring/diagnostic messages sent in the absence of normal system messages. As will be discussed in greater detail below (and may be more readily traced in the illustration of FIG. 8), based on a lack of responsiveness (e.g. either no response or a response inconsistent with an expected response) of received messages, if any, to transmitted messages, a cluster node sends a command to the operating system of any application node (or the other cluster node) which is not performing correctly (if, in fact, the application is running) to re-start the application (or cluster node). In this regard, an unresponsive application is not deactivated but assumed to be already closed; thus resulting in a more rapid re-start. Each application is uniquely identified and, if the application node is, in fact, running although unresponsive, a duplicate will appear within the same server/system on the cluster which may then be shut down once functionality of the application node is restored. When an application is started or re-started, it will then randomly choose a cluster node through which to communicate on the same server/system. When a cluster node is started, it will generate appropriate messages and commands to integrate itself into the network. Thus, the cluster nodes can monitor each other as well as the applications which may be connected to either cluster node at any given time.

Thus, it is seen that the network articulation, connectivity and mutual monitoring and control between cluster nodes in accordance with the invention protects against multiple types of failures: failures of single applications (which are restarted locally), failure of a cluster node (which, also being an application, is restarted by the other cluster node), failure of a server/system (applications are re-started on other server/systems), and failure of multiple systems (e.g. site failures) to the extent that servers/systems which are adjacent, in network topology, to failed servers/systems are located at different network "sites" that need not be geographically separated but which have different failure sources, such as different power sources, as will be discussed in greater detail below.

It should be appreciated, in this regard, that using a single server/system to run all applications leaves the server/system vulnerable to conditions which may cause failure thereof beyond failures of applications and cluster nodes and communications failures such as power failure, hardware failure or server/system failures. Therefore, it is preferred to use at least two systems or servers as depicted in FIG. 3.

Figure 3:
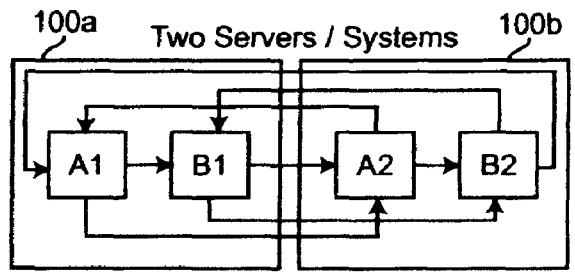
FIG. 3 is a schematic diagram of exemplary connection of cluster nodes for an implementation of the invention including two servers and four cluster nodes.

FIG. 3 illustrates the general linkage connection pattern used in clustering in accordance with the invention when two or more server/systems (e.g. 100a, 100b in FIG. 3; 100a, 100b, 100c in FIG. 4) are employed, as is preferred (and is simplified to the connections shown in FIG. 2 when only a single server/system is employed). Each A cluster node (e.g. A1) connects to or is in communication with the local cluster node B (e.g. B1) as well as the cluster node A on the next machine/server in the networked system (e.g. A2) Each B cluster node (e.g. B1) connects to or is in communication with both the A and B cluster nodes on the next machine (e.g. A2 and B2). Thus each A cluster node is in communication with the local B cluster node and the A and B cluster nodes of the previous server/system for a total of four bi-directional links and each B cluster node is in communication with the B cluster node of the previous server/system, the local A cluster node and the A and B cluster nodes of the next server/system, again for a total of four bi-directional links. It will be appreciated that when only a single server/system is employed (and "next server/system" is, in fact, the same server/system), this connection configuration reduces to that shown in FIG. 2. Each cluster node is also preferably configured with a complete list of the servers/machines in the cluster and the systems they are on which is sufficient to identify the "next" server/machine and perform other functions and access other resources as well.

Figure 8:
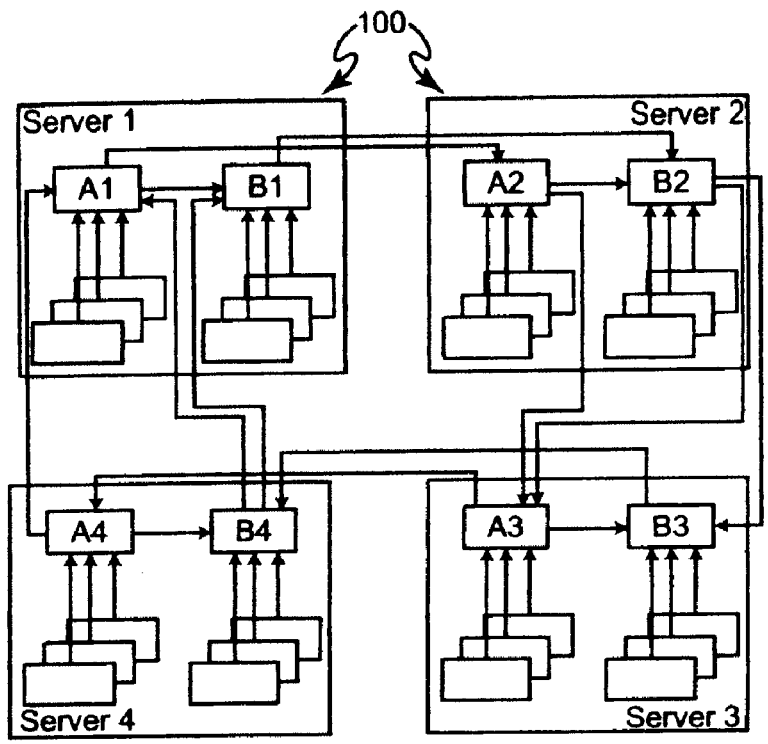
FIG. 8 is a schematic diagram similar to FIG. 5 but including application node connections which is useful in facilitating understanding of failover recovery in accordance with the invention for application node failure.

That is, each cluster node contains information describing the entire cluster so that it can not only connect to the next system but also, when it may appear that a failure has been detected at a cluster node, that cluster node can determine which other cluster node should have also observed the apparent failure and can look to that cluster node for confirmation as can also be readily traced in the illustration of FIG. 8. (Communication link failures can be discriminated from processor failures such as application, application node, cluster node and server/system failures by determination of whether or not the same apparent failure is observed at a particular cluster node or server/system.)

Figure 4:
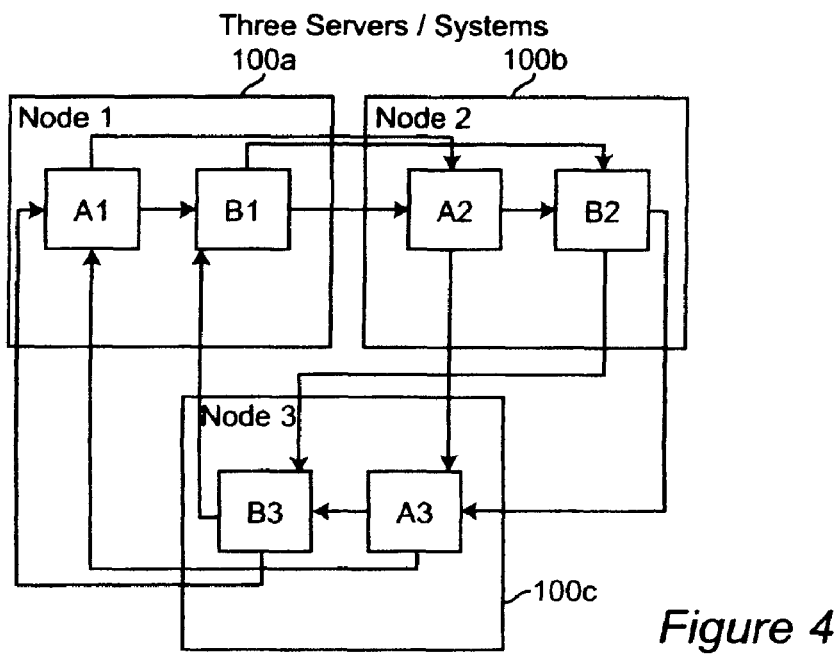
FIG. 4 is a schematic diagram of exemplary connection of cluster nodes for an implementation of the invention including three servers and six cluster nodes.
Figure 5:
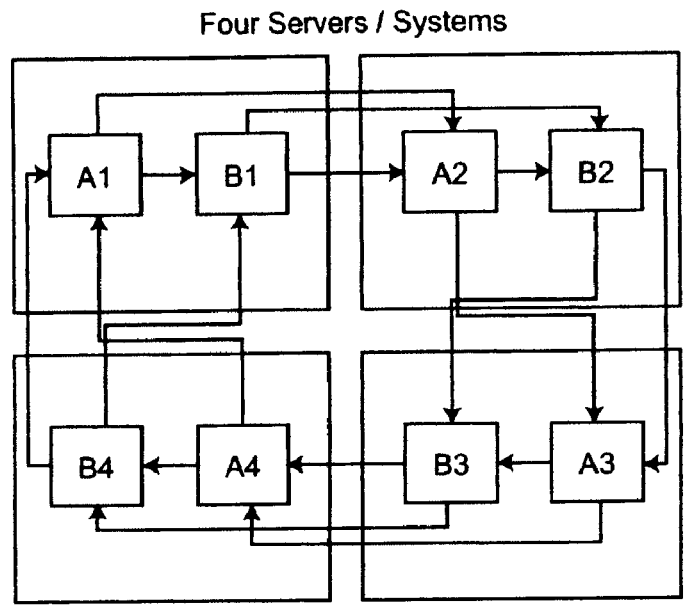
FIG. 5 is a schematic diagram of exemplary connection of cluster nodes for an implementation of the invention including four servers and eight cluster nodes.
Figure 6:
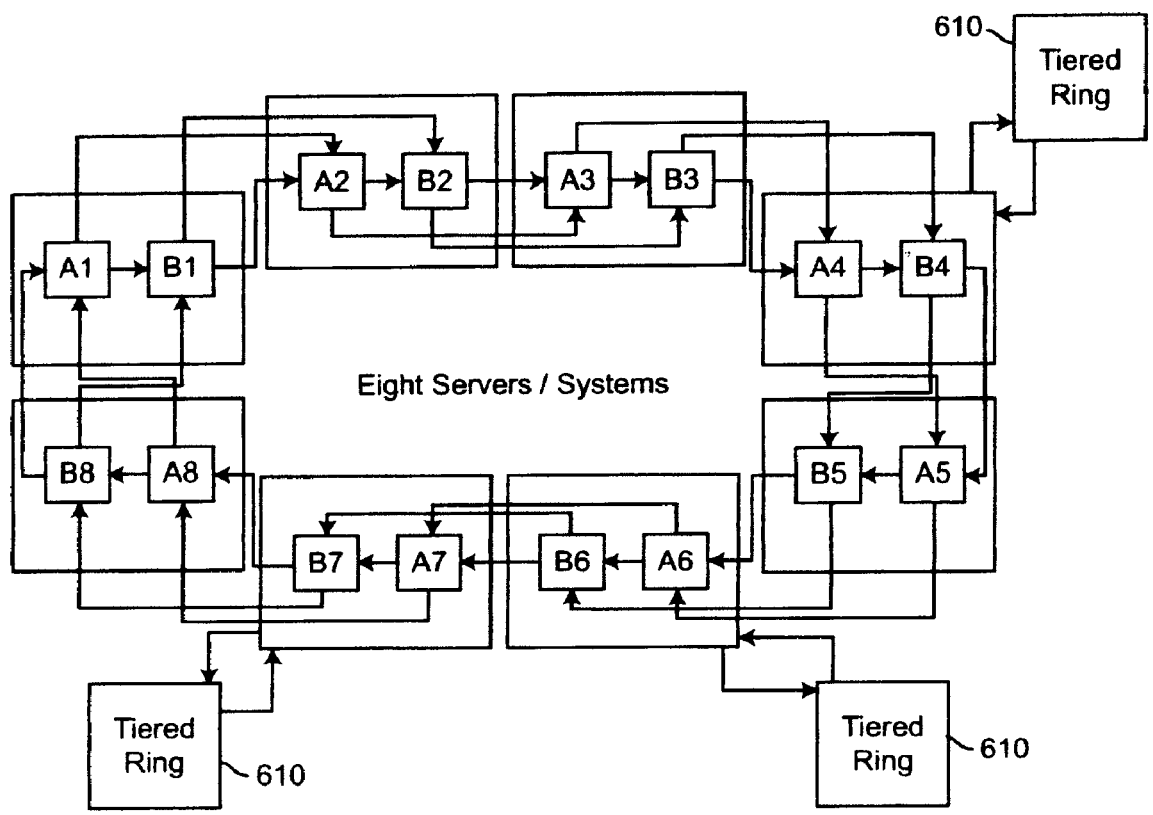
FIG. 6 is a schematic diagram of exemplary connection of cluster nodes for an implementation of the invention including eight servers and sixteen cluster nodes.

This pattern of ring interconnections may be applied to three or more servers as illustrated in FIGS. 4-6, illustrating implementations of three, four and eight servers/machines, respectively. To generalize, the servers/machines in any number are connected in a circular, re-entrant sequence with possible extension to other rings in tiers connected to a server/system of a central ring as illustrated in an exemplary, so-called star form at 610 of FIG. 6. In FIGS. 3-6, the "next" server/machine progresses in a clockwise direction irrespective of whatever physical distribution of servers/systems may be presented.

This pattern can scale up or down and may include a very large number of servers/machines depending on the needed resources and the traffic load carried. Such scaling to add further servers/systems is driven by the need for additional hardware to run desired applications which may be done as discussed above and which necessarily increases network traffic load. (For example, if more CPU capacity or memory is needed to accommodate additional applications or application nodes, more servers/systems can be added to the cluster as is a common practice as an alternative to physical upgrades of existing servers/systems which does not grow the cluster. If such addition of servers/systems becomes unwieldy, a single ring configuration can be managed to become a two-tiered ring as a central ring with other rings attached to it in a star-configuration pattern; much in the manner provided by known internet routers.)

In short, each cluster node knows the application nodes that are connected to it as well as what is connected to every other cluster node. Every time an application node connects to or disconnects from either cluster node of any server, that cluster node broadcasts a message notifying the other cluster nodes of the update over a subset of the link sequence A1→B1→A2→B2→A3→...→A1, half of which links are redundant (but without requiring redundant hardware) since, for example, B1 is linked to both A2 and B2 while A1 is linked to B1 and A2, as discussed above.

Figure 10:
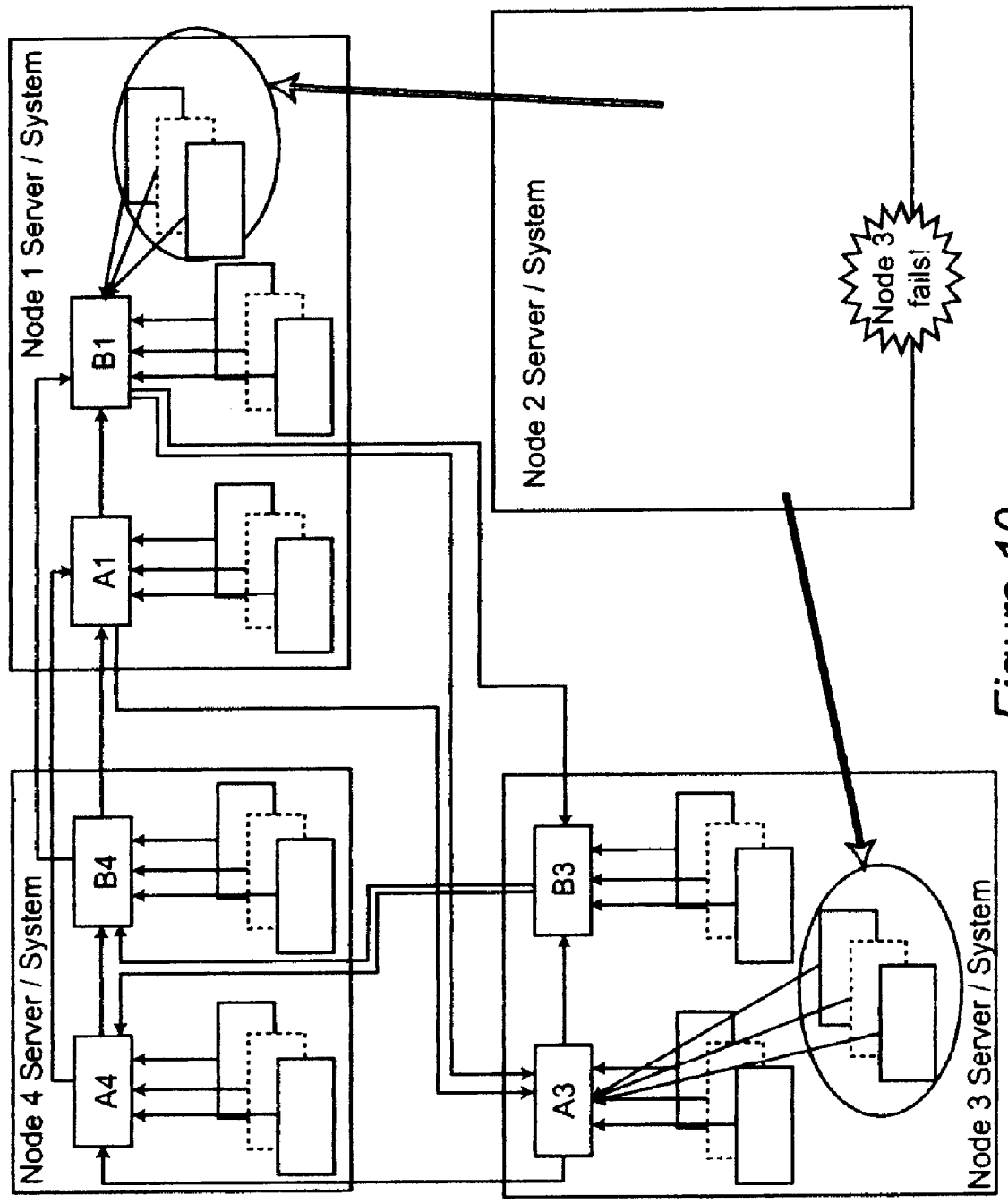
FIG. 10 is a schematic diagram similar to FIG. 5 which is useful in facilitating understanding of failover recovery for a server/system failure or site failure in accordance with the invention.

The handling of a failure of an application node or a cluster node has been described above. If there is a server failure, say, server or network node 2, both cluster nodes A2 and B2 will disappear from the network as is also illustrated in FIG. 10. The failure to receive normal communications from cluster nodes A2 and B2 is directly detected by cluster nodes B1 and A3, respectively, since each of these cluster nodes has (or had) a direct link to both cluster nodes A2 and B2. In response, cluster node B1 will connect directly to cluster node A3 and communicate the detection of the apparent failure of server/system 2. If cluster node A3 has made a similar detection and concurs with the observation of B1, cluster node B1 will send messages throughout the cluster; notifying all other cluster nodes that server/system 2 is down and to command each cluster node to start up a specific subset of the failed application nodes from system 2 from the respective cluster nodes, so that all application nodes may be running again within a very short period of time, regardless of the status of server/system 2. In this regard, it is preferred that, in this case, only B1 (or, more generally any other particular node, particularly one which offers an advantage over other nodes in recovery speed) will send such messages to the exclusion of other cluster nodes such as, in this case, A3 in order to avoid duplication. (On the other hand, such a message will be anticipated by other nodes, one of which will perform similar operations in regard to another node if such a message is not received due to, for example, the unlikely event that cluster node B1 or a communication link becomes non-functional in the interim.)

Further, it should be noted in this regard that B1 is chosen from a coding point of view because, under the assumptions of this example, it is already in what is deemed a reaction mode since it is communicating with A3 for confirmation. That is, in general, the first cluster node to observe an apparent failure and seek to confirm the observation from another cluster node is assigned to conduct the necessary corresponding network messaging upon confirmation of the failure from another node in order to reduce processing time as well as protect against false positive detection and duplication of messaging which are, at that point, in the nature of remote procedure calls to start particular processes which should not be duplicated. As a result, when cluster node A1 is notified that system 2 has failed, it connects to A3 to re-establish the ring pattern while B1 also connects to B3 but maintains the link to A3 which was used for verification of the failure observation. By the same token, the applications which were running on server/system 2 at the time of failure detection are distributed across remaining systems by sending messages to cluster nodes on those systems to start the applications from the local cluster node(s) but which cannot be accomplished directly from, in this example, B1, since cluster nodes track both used and free CPU capacity and memory so that corrective distribution is based on free resources and not necessarily on the number of applications. This communication is in the nature of a so-called "broadcast" communication to other cluster nodes and has been experimentally demonstrated to be capable of starting over one hundred applications in a fraction of a second.

When server/system 2 is repaired and can resume participation in the network, the cluster nodes on it are restarted (e.g. manually); causing them to reconnect to server/system 3, whereupon the cluster nodes on system 1 and 3 re-expand the ring to include server/system 2. The two cluster nodes on a server/system which has been repaired must be restarted manually or as part of the operating system boot process because the server/system which has failed and been repaired is not, at that point, part of the cluster and its resources cannot be used until its cluster nodes rejoin the ring. (While cluster nodes in the ring may be able to communicate with other "known good" servers/systems that may be added, as necessary, to grow the ring, continuous or periodic polling of a server/system which is known to have failed is deemed undesirable from the viewpoints of both processing and communication overhead in a networked arrangement which is functioning correctly and within nominal operational conditions and margins particularly in comparison with the relatively simple alternative of initiating communications from the repaired system which causes the corrective links established upon failure detection to be changed at a suitably convenient time to re-form the original ring.)

It should be noted in this regard, that some surplus of processing capacity is thus required for each server/system in order to carry the processing load corresponding to communication with application nodes that may connect to it in the absence of the failed server/system. However, such processing capacity surplus would ordinarily be present in prudent network design and, in any case, does not require redundant processors such as hot standby machines as discussed above. Therefore, in accordance with the invention, hardware requirements for reliable functioning of networked computers are greatly reduced while failover recovery time of the networked system is also made very short. Additionally, problems associated with mismatch of configuration of a hot standby machine with the configuration of the machine it is to replace are avoided, because the failed components are restarted on machines which are already actively participating in the cluster and therefore are properly configured and operational. Moreover, no additional hardware beyond that needed for network communications is required for monitoring since monitoring is based on responsiveness to normal or test messages. As a further benefit of the invention, communication link failures are addressed in the same manner and using the same resources as are used for a failure at or below the hierarchical level of a server/system.

Additionally, it should be noted that there are no dependencies on the operating system(s) for detection or recovery which allows the use of mixed operating systems over the cluster. Further, mixed hardware having different types of processors or which may operate at different speeds or with different memory sizes can be used rather than being limited to fixed hardware such as would be necessarily the case when using hot-standby processors alluded to above.

Figure 9:
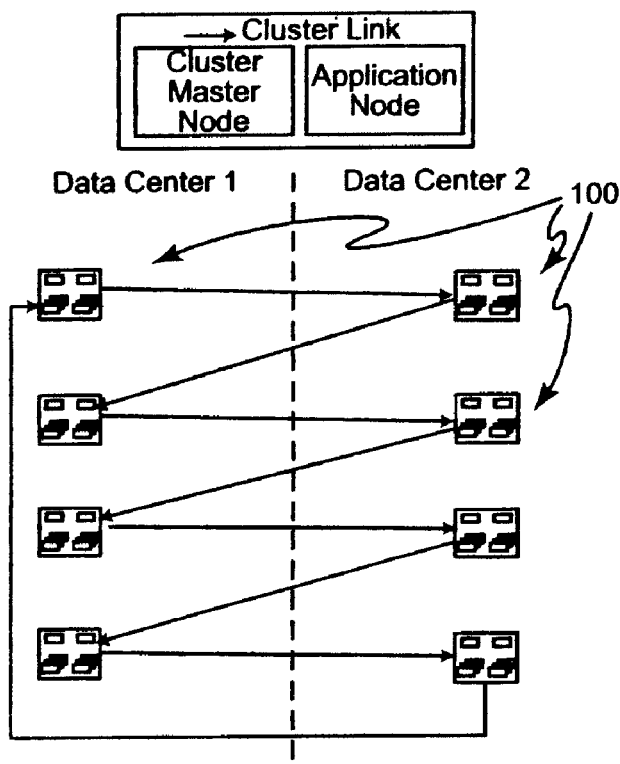
FIG. 9 illustrates a preferred multiple site layout distribution for optimal failover protection in accordance with the invention.

It should be particularly noted from the above discussion that while the operations are quite simple and may be executed rapidly with little processing overhead, the invention protects against false positive failure detection through redundant links and verification across the network that are achieved without redundant hardware which also serves the purpose of discrimination of communication link failure which can be corrected through normal re-routing procedures. Additionally, if the cluster is configured so that the adjacent servers/systems in the ring are staggered across sites of a distributed network (e.g. even-numbered servers/systems in a first location and odd-numbered servers/systems in a second location) as illustrated in FIG. 9, the invention is capable of recovering from a site failure with half the servers/ systems lost. When two (or more) sites are used in this manner, it is, however, important to size the hardware at each site such that the load on the hardware attributable to the cluster is not more than one-half (or some other fraction depending on the number of sites) of the processing capacity of the site, since the processing load of the failed site will be assumed by the servers/systems of the remaining other site(s). Spare capacity requirements of servers/systems is directly related to the number of servers/systems remaining after a failure. In other words, the necessary spare capacity diminishes with the number of sites or server/systems remaining after a failure that is the "worst case" anticipated in the cluster.

Figure 7:
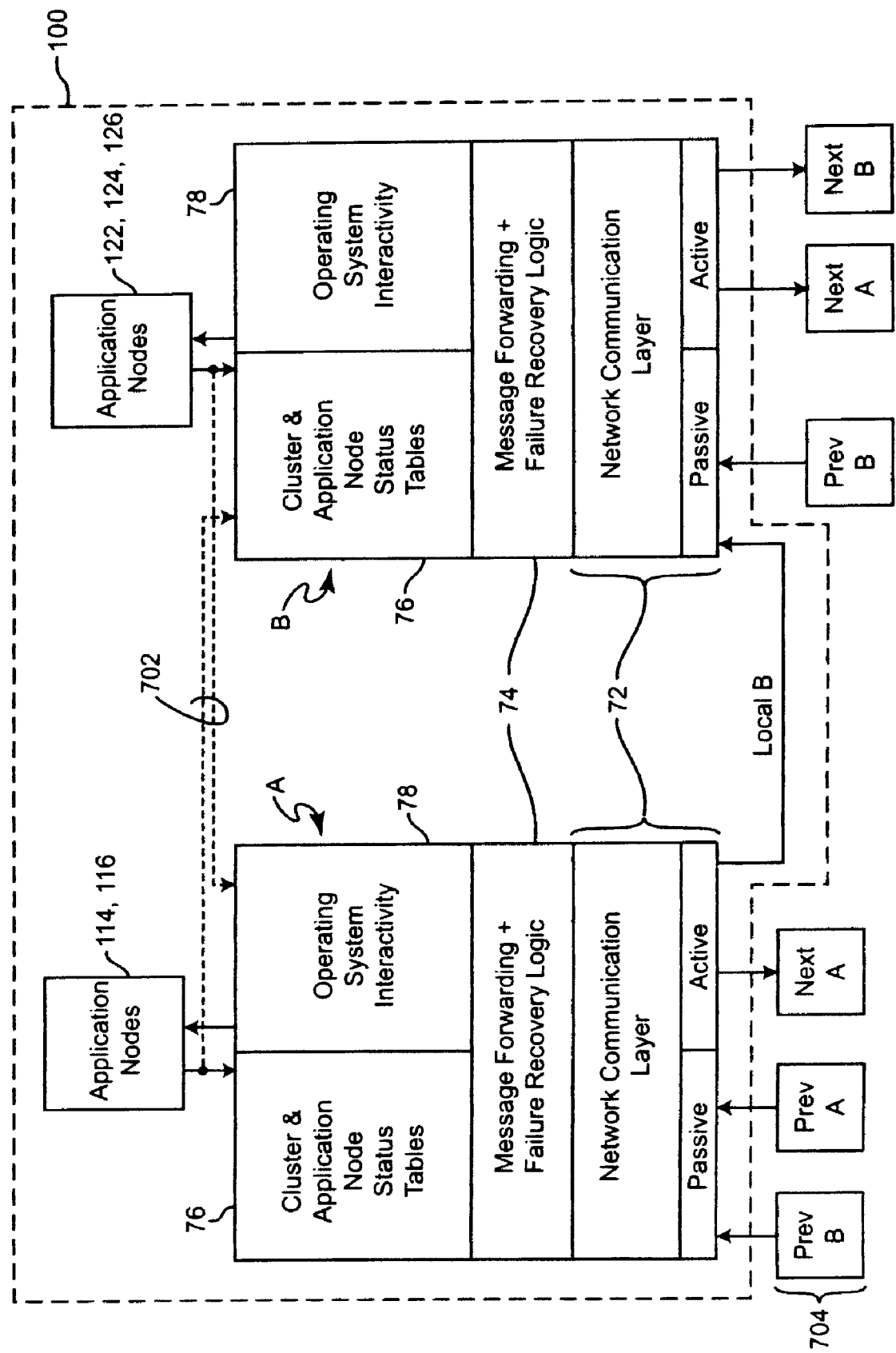
FIG. 7 is a detailed schematic diagram illustrating internal functionality of cluster nodes.

In the interest of completeness a preferred configuration of internal details of a pair of cluster nodes A (110) and B (120) supporting the above-described functions and operations thereof is illustrated in FIG. 7. It will be recognized that FIG. 7 is similar to FIGS. 1 and 2 in overall content but is arranged to be more detailed in some aspects while being less detailed in others which have been described above. For example, application nodes 114 and 116 and 122, 124 and 126 of FIG. 1 are commonly depicted in FIG. 7. The randomly selected connection of application nodes to cluster nodes A and B that are depicted in FIG. 1 are depicted with solid lines while possible, randomly selected connections alluded to above but not depicted in FIG. 2 are illustrated with dashed lines 702. Similarly, the connections between cluster nodes which are not depicted in FIG. 1 but are depicted in reduced form in FIG. 2 and more fully in FIGS. 3-6 are depicted in a more generalized form by arrows and cluster and server/system legends in the lower portion of FIG. 7. It should be understood that the entire description of FIGS. 1-6 above is also fully applicable to FIG. 7 which is arranged to emphasize a preferred processing architecture for the cluster nodes A and B.

As shown in FIG. 7, the preferred processing architecture for carrying out the invention is comprised of a network communication layer 72, a message forwarding and failure recovery logic layer and a further layer comprising cluster node and application node status tables 76 and an operating system interactivity module 78. Each layer communicates bidirectionally with layer(s) which are depicted as being adjacent to it. It should also be noted that, as in Figures described above, arrows indicate the direction of initial, active communications over a depicted link but thereafter, responses to such initial communications (including acknowledgments) are performed passively in the opposite direction and any further communications incident thereto are provided bidirectionally.

Thus communications to the application nodes is depicted as being from operating system interactivity module 78 which starts applications, obtain CPU/memory loads and the like. The operating system interactivity module thus allows the cluster node to determine free CPU or memory capacity and to control the OS to start an application (which are system calls and do not involve the network). An application, as part of the start-up operation, connects to the cluster node through the network communication layer and announces itself along with how much CPU and memory it will be using. Status information from applications and application nodes may be provided to application node status tables 76 from the application nodes, if desired, which may be useful, for example, in tracking whether or not a response is anticipated from a particular application. However, such a function or even communication from an application to the status tables or storage of application status is not necessary to the successful practice of the invention. That is, for successful practice of the invention, it is sufficient for the status tables to simply contain records that the failure recovery logic 74 has created based on what has been communicated to the status tables from the other cluster nodes and such status tables should have the same entries in all cluster nodes of all servers/systems of the cluster. Similarly, cluster node status is provided over links collectively identified at 704, including status of the local cluster node B.

In regard to communication links 704 depicted in FIG. 7, the legends "passive" and "active" also refer to the initial communication (which may be followed by bidirectional communications). That is, status information, failure detection reports and requests for confirmation of an observed apparent failure and all regular communications between applications may be transmitted actively but are received passively when originating in other servers/systems or a local cluster node. Thereafter, the "active" and "passive" designations are substantially irrelevant.

Otherwise, the network communication layer 72 functions essentially as a router, responsive to message forwarding and failure recovery logic 74 in any of a number of known or foreseeable ways for the forwarding of messages such that any cluster node or application node participating in the cluster can communicate with any other cluster or application node as alluded to above. Additionally, however, message forwarding and recovery logic 74 will preferably include an arrangement for logging forwarded communications and monitoring received response messages for responsiveness such as detecting the duration of time before a response (possibly a simple acknowledgment of receipt), if any, is received from the ultimate destination of the message or whether or not a parsing of a message received from the ultimate destination reveals whether or not it is an appropriate reply to the message previously sent.

If an apparent failure of a server/system is detected, as discussed above, the failure logic included in message forwarding and recovery logic 74 will preferably contain logic (details of which are unimportant to the successful practice of the invention) to interrogate cluster node status tables 76 to determine another cluster node which should have observed the apparent failure and to direct an appropriate inquiry thereto through network communication layer 72. Then, as alluded to above, if the apparent server/system failure is confirmed, the network communication layer 72 is directed from the failure recovery logic 74 and the information in the status tables 76 to perform a broadcast status change over network links (without involvement of operating system interactivity layer 78) as discussed above to update the status tables of all cluster nodes and thus initiate consequent re-connection of the ring and starting of additional applications consistent with available CPU/memory capacity to maintain the functionality of the remaining servers/systems of the cluster.

If, however, the apparent failure is of one or more applications or a single cluster node rather than of a server/system, such confirmation of observation of the apparent failure is not performed but the failed application(s) and/or the failed cluster node (which is also an application), is closed (if open) and restarted (which, as noted above, may be performed very quickly, even in large numbers), making appropriate updates in the status tables 76 (e.g. for cluster nodes but not necessarily applications or application nodes) as such actions are performed. These different functions, depending on the type of failure detected, thus require somewhat different logic (e.g. to confirm failures and broadcast status changes or to simply restart applications) but which is collectively illustrated in the same failure recovery logic layer 74.

The same basic actions are taken in regard to failure of both cluster nodes of a particular server/system although the communication links used between and within respective cluster nodes will necessarily be different. However, in the case where a server/system appears to have failed, as depicted in FIG. 10, failure recovery logic 74 alters the cluster node status tables 76, forwards messages to update the cluster node status tables of other servers/systems participating in the cluster and initiates actions and messages to reconstitute the ring in accordance with the updated cluster node status. It should be noted that in the particular illustration shown, the resulting communication links following a failure and applications corresponding to those of the failed server/system are depicted, for simplicity, as being opened on only the adjacent servers/systems. This would correspond to an actual case where additional or spare processing capacity was only available on nodes 1 and 3. In a more general case where some excess or spare processing capacity was present on all or other remaining servers, corresponding applications would be opened on all of them to the extent of that excess or spare capacity.

In accordance with the invention, such actions will automatically be performed even if numerous server/system failures occur simultaneously as in a site failure as alluded to above since the cluster node status tables maintain status of all cluster nodes in the cluster and can reconstitute a ring as described above with whatever servers/systems remain functional by defining a new sequence of servers/systems and the server/system which will be "next" in sequence for each remaining server/system. It can be readily understood that site failure recovery will be optimized if adjacent servers/systems in the original ring are distributed alternately between sites or data centers as depicted in FIG. 9 since communication links will only need to be shifted to the next server/system following the failed server/system for each failed server/system in an operation which can be performed locally within the site or data center.

In view of the foregoing, it is seen that the configuration and interconnection of cluster nodes distributed among one or more servers/systems in accordance with the invention provides extremely rapid recovery from failures at any hierarchical level of the system and does so without redundant processor hardware (but only some degree of spare CPU/memory capacity) and without separate communication links or hardware for monitoring and control while effectively providing redundancy over normal communication links for purposes of monitoring and control of processors while additionally monitoring the normal communication links. Greater hardware and operating system flexibility is also provided while any need for "hot-standby" processors is avoided. By suitably strategic distribution of cluster nodes over the network, recovery from very deep levels of failure (e.g. site failure) can be provided. The invention is applicable to any size network involving any number of server/systems.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A network of connected computers comprising
at least one server/system, each server/system having two cluster nodes, each said cluster node being capable of monitoring responses to messages transmitted to another cluster node from a cluster node with which it is in communication,
an application node capable of connecting to one of said cluster nodes of said at least one server/system for communication to another application node, wherein
a first cluster node of said two cluster nodes is in communication with the second cluster node of said two cluster nodes and a first cluster node of said two cluster nodes of a next server/system of said network for performing said monitoring of responses, and
said second cluster node of said two cluster nodes is in communication with first and second cluster nodes of said next server/system of said network for performing said monitoring of responses,
whereby redundant communications are provided such that any failure of a response of said responses to messages as detected at any cluster node of said cluster nodes can be confirmed from another cluster node of said cluster nodes over said network for discrimination of a failures of a said application node, a said cluster node or a said server/system can be discriminated from at least a communication failure.

2. A network as recited in claim 1 wherein said network comprises a single server/system and said next server/system is said server/system.

3. A network as recited in claim 1 wherein said network comprises a first server/system and a second server/system wherein a next server/system of said first server/system is said second server/system and a next server/system of said second server/system is said first server/system.

4. A network as recited in claim 1 wherein said network includes a plurality of servers/systems and said connections of respective servers/systems to a next server/system form a ring network.

5. A network as recited in claim 4, wherein said ring network comprises a multi-tiered ring network having a central ring and additional rings connected to one or more servers/systems in a star configuration.

6. A network as recited in claim 1, wherein one of said first cluster node and said second cluster node includes
means for routing a message between said application node and any other said application node, and
means for detecting an apparent failure by monitoring responsiveness of any message from said any other said application node to said message.

7. A network as recited in claim 6, wherein one of said first cluster node and said second cluster node further includes
logic means, responsive to said means for detecting of an apparent failure, for determining another cluster node at which said apparent failure should be observable and sending an inquiry to said cluster node to confirm observation of said apparent failure.

8. A network as recited in claim 7, wherein one of said first cluster node and said second cluster node further includes
means for storing status of each cluster node participating in a cluster, and
means for updating said means for storing status of said cluster nodes of said cluster upon confirming an apparent failure of a server/system of said cluster.

9. A network as recited in claim 8, further including
means for forming communication links between servers/systems of a cluster to exclude a failed server/system responsive to updating of said means for storing status of said cluster nodes.

10. A network as recited in claim 6, further including
means for closing and restarting a cluster node in response to confirmation of an apparent failure of a cluster node.

11. A network as recited in claim 6, further including
means for closing and restarting an application or application node in response to detection of an apparent failure in an application or application node, respectively.

12. A method of operating a network of connected computers comprising at least one server/system, each server/system having two cluster nodes, each said cluster node being capable of monitoring responses to messages transmitted to another server node, an application node capable of connecting to one of said cluster nodes of said at least one server/system for communication to another application node, wherein a first cluster node of said two cluster nodes is in communication with the second cluster node of said two cluster nodes and a first cluster node of said two cluster nodes of a next server system of said network, and said second cluster node of said two cluster nodes is in communication with first and second cluster nodes of said next server/system of said network, said method comprising steps of
    detecting an apparent failure by monitoring responsiveness of any message from any other application node to said message, and
    closing, if necessary, and restarting an application in response to detection of an apparent failure in an application, application node or cluster node.

13. A method as recited in claim 12 wherein said network comprises a single server/system and said next server/system is said server/system.

14. A method as recited in claim 12 wherein said network comprises a first server/system and a second server/system wherein a next server/system of said first server/system is said second server/system and a next server/system of said second server/system is said first server/system.

15. A method as recited in claim 12 wherein said network includes a plurality of servers/systems and said connections of respective servers/systems to a next server/system form a ring network.

16. A method as recited in claim 15, wherein said ring network comprises a multi-tiered ring network having a central ring and additional rings connected to one or more servers/systems in a star configuration.

17. A method as recited in claim 12, wherein one of said first cluster node and said second cluster node performs further steps of
    routing a message between said application node and any other said application node.

18. A method as recited in claim 12, wherein one of said first cluster node and said second cluster node performs the further step of
    determining another cluster node at which said apparent failure should be observable and sending an inquiry to said cluster node to confirm observation of said apparent failure responsive to said detecting of an apparent failure.

19. A method as recited in claim 18, wherein one of said first cluster node and said second cluster node performs the further step of
    storing status of each cluster node participating in a cluster, and
    updating said status of said cluster nodes of said cluster upon confirming an apparent failure of a server/system of said cluster.

20. A method as recited in claim 19, including the further step of
    forming communication links between servers/systems of a cluster to exclude a failed server/system responsive to updating of said status of said cluster nodes.

\* \* \* \* \*